Jan. 9, 1968 H. GARDERE 3,363,188

DEVICE FOR ADJUSTING THE GAIN OR ATTENUATION OF AN ELECTRIC WAVE

Filed March 5, 1964 4 Sheets-Sheet 1

INVENTOR
Henri Gardere
By Paul M. Craig, Jr.
ATTORNEY

Jan. 9, 1968 H. GARDERE 3,363,188
DEVICE FOR ADJUSTING THE GAIN OR ATTENUATION OF AN ELECTRIC WAVE
Filed March 5, 1964 4 Sheets-Sheet 2
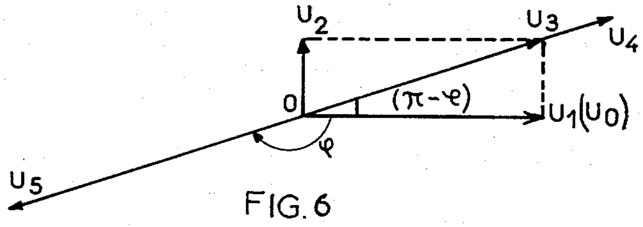
FIG. 6
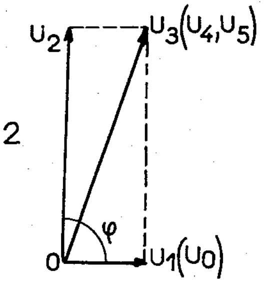
FIG. 2
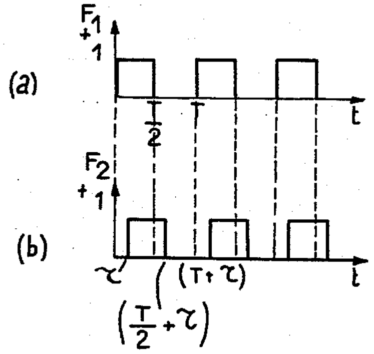
FIG. 3
| | 0 – τ | τ – T/2 | T/2 – T/2+τ | T/2+τ – T |
|---|---|---|---|---|
| F1 | +1 | +1 | 0 | 0 |
| F2 | 0 | +1 | 1 | 0 |
| (F1).(F2) | 0 | +1 | 0 | 0 |
FIG. 4
INVENTOR
Henri Gardere
By Paul M. Craig, Jr.
ATTORNEY Jan. 9, 1968 H. GARDERE 3,363,188

DEVICE FOR ADJUSTING THE GAIN OR ATTENUATION OF AN ELECTRIC WAVE

Filed March 5, 1964 4 Sheets-Sheet 3

INVENTOR
Henri Gardere
By Paul M. Craig, Jr.
ATTORNEY

Jan. 9, 1968 H. GARDERE 3,363,188

DEVICE FOR ADJUSTING THE GAIN OR ATTENUATION OF AN ELECTRIC WAVE

Filed March 5, 1964 4 Sheets-Sheet 4

INVENTOR

HENRI GARDERE

United States Patent Office 3,363,188
Patented Jan. 9, 1968

3,363,188

DEVICE FOR ADJUSTING THE GAIN OR ATTENUATION OF AN ELECTRIC WAVE

Henri Gardere, 178 Rue Jeanne d'Arc, Paris XIII, France

Filed Mar. 5, 1964, Ser. No. 349,594
Claims priority, application France, Mar. 19, 1963, 928,401, Patent 1,192,595
10 Claims. (Cl. 328—158)

ABSTRACT OF THE DISCLOSURE

A device for adjusting the gain or attenuation of an electric wave including first and second switching modulators connected in series, a source of carrier voltage connected on the one hand directly to the control input of the first modulator and through a phase shifting network to the control input of the second modulator, and a phase reversal network connected by the phase shifting network and the control input of the second modulator.

The present invention relates in general to voltage control systems and more particularly to a device for controlling the gain or attenuation of an electric wave in response to an applied control voltage.

In U.S. Patent No. 3,032,724, there is described a device for controlling the gain or attenuation of an electric wave in response to a control voltage which is characterized by the fact that it comprises two inversion or ring-type modulators directly connected together in series and fed from a common fixed-frequency carrier voltage source, and a member disposed between the said carrier voltage source and one of the modulators, so as to produce between the carrier voltage of the two modulators a phase-shift which depends upon the value of a control voltage applied to the said member.

While the device described in the above-mentioned patent provides numerous advantages over other prior art devices of a similar nature and operates very effectively to perform its intended function, it has been found through use that the accuracy of this device depends very heavily upon the accuracy of the 90° phase-shifting network utilized therein such that inaccuracies introduced by this 90° phase network produce variations of equal magnitude in the phase-shift applied to the carrier frequency. Since the degree of phase-shift normally employed in this device is in the neighborhood of $\pi/2$, and since the accuracy of the gain or attenuation control produced by the device is directly dependent upon the accuracy of the value of $(\pi/2-\alpha)$, even so-called slight variations in $\alpha$ produced by inaccuracies in the phase network provide an amplified error in the output of the device.

Therefore, the device in accordance with the instant invention provides for a phase inversion between the output circuit of the phase shifter and the control circuit of the second modulator which considerably reduces the required criticality of the phase network providing for an over-all increase in the stability and accuracy of the device.

In addition, the device according to the instant invention utilizes switching modulators rather than the inversion or ring-type modulator previously used. In this way successive multiplications of the current wave applied to the input of the first modulator by the characteristic functions of the two modulators is achieved.

It is an object of the present invention to provide a device for adjusting the attenuation or gain of an electric wave which exhibits increased stability and accuracy regardless of slight variations in the accuracy of its individual components.

It is another object of the instant invention to provide a device of the type described which provides an output voltage proportioned to the quotient of the input voltage and an applied control voltage utilizing switching modulators and a "$D_2$-type" phase shifter.

It is a further object of the instant invention to provide a device of the type described which provides an output voltage proportional to the product of the input voltage and an applied control voltage utilizing switching modulators and a "$D_1$-type" phase shifter.

It is still another object of the instant invention to provide a device of the type described which comprises switching modulators and a phase inversion between the output of the phase shifter and the control circuit of the second modulator so as to reduce effects of inaccuracies within the phase shifter upon the voltage of the device.

It is still a further object of the instant invention to provide a device of the type described which produces an output voltage which is proportional to the product of the input voltage and an applied control voltage applied to a phase-shifting means capable of producing a phase-shift whose tangent is proportional to the magnitude of the control voltage.

It is yet another object of the instant invention to provide a device of the type described which produces an output voltage which is proportional to the quotient of the input voltage and an applied control voltage applied to a phase-shifting means capable of producing a phase-shift whose tangent is inversely proportional to the magnitude of the control voltage.

These and other objects and many of the attendant benefits of this invention will be readily appreciated as the same becomes better understood by reference to the following detailed description when considered in connection with the accompanying drawings, in which:

FIGURES 1*a* and 1*b* show, as prior art, the structure of two devices according to the above-mentioned patent;

FIGURE 2 is a diagram showing the phase relationship between voltages at various points of the devices illustrated in FIGURES 1*a* and 1*b*;

FIGURE 3 represents, as a function of time, the characteristic functions of the modulators utilized in accordance with the instant invention;

FIGURE 4 is a table of values of the functions illustrated in FIGURE 3 at various instants of time;

Figure 1A:
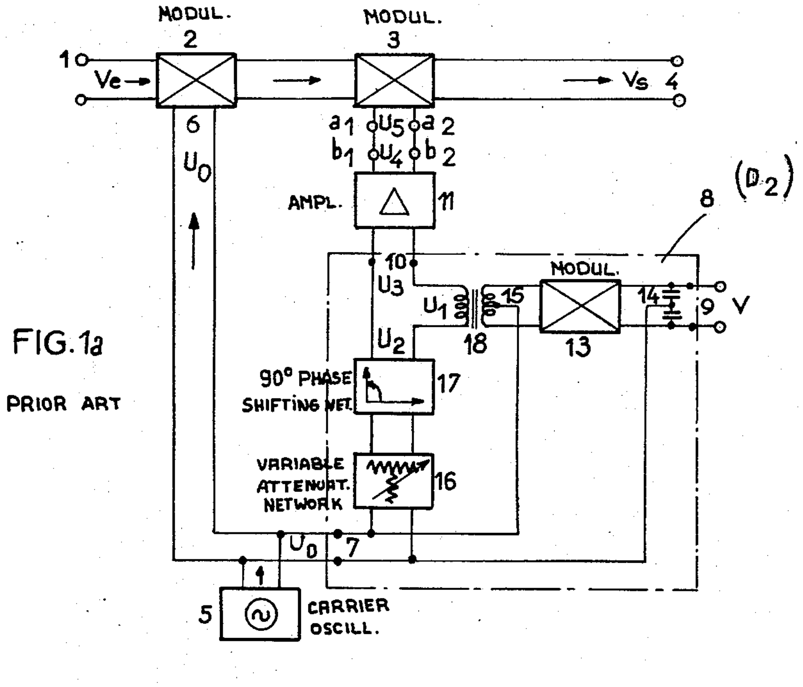
Figure 1B:
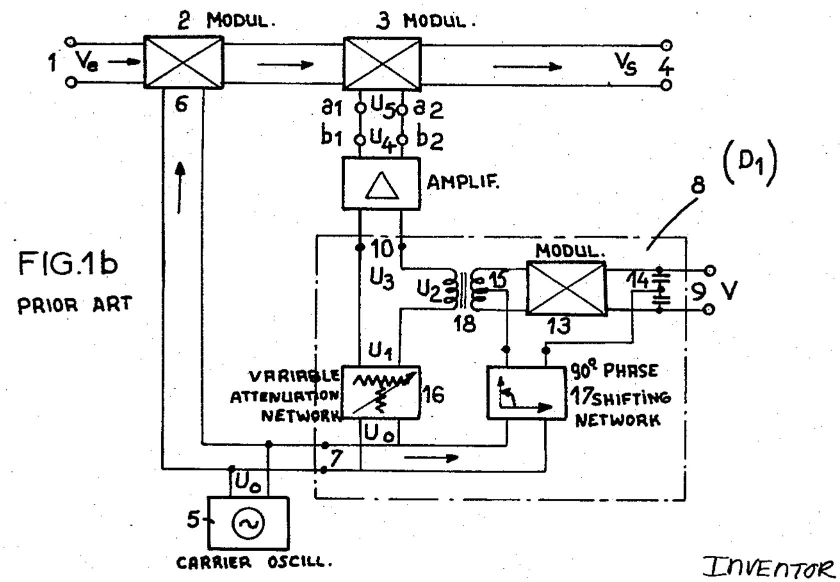
Figure 5A:
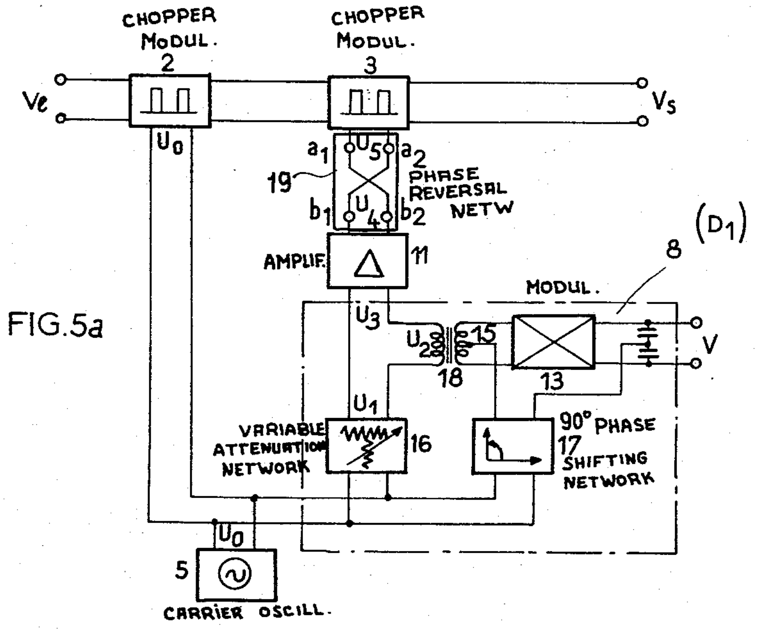
Figure 5B:
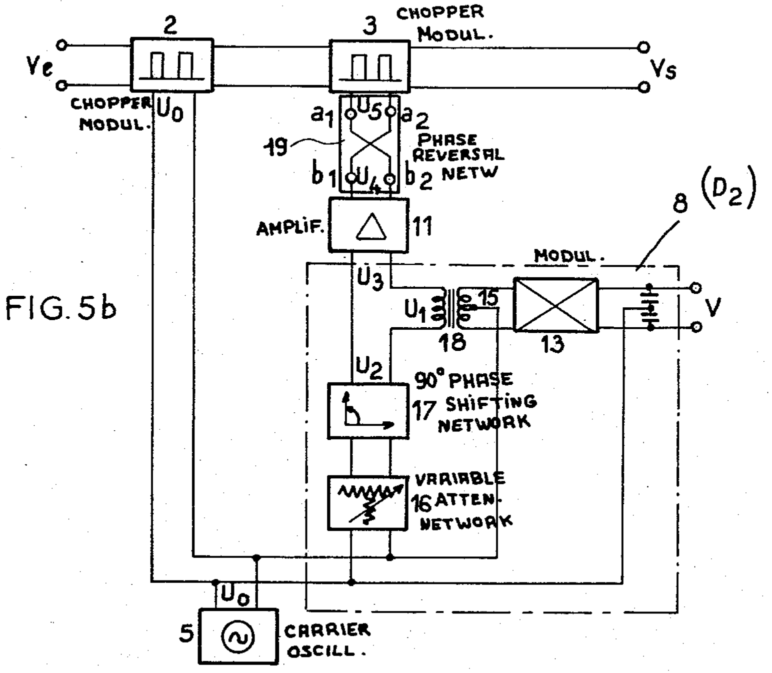
Figure 5C:
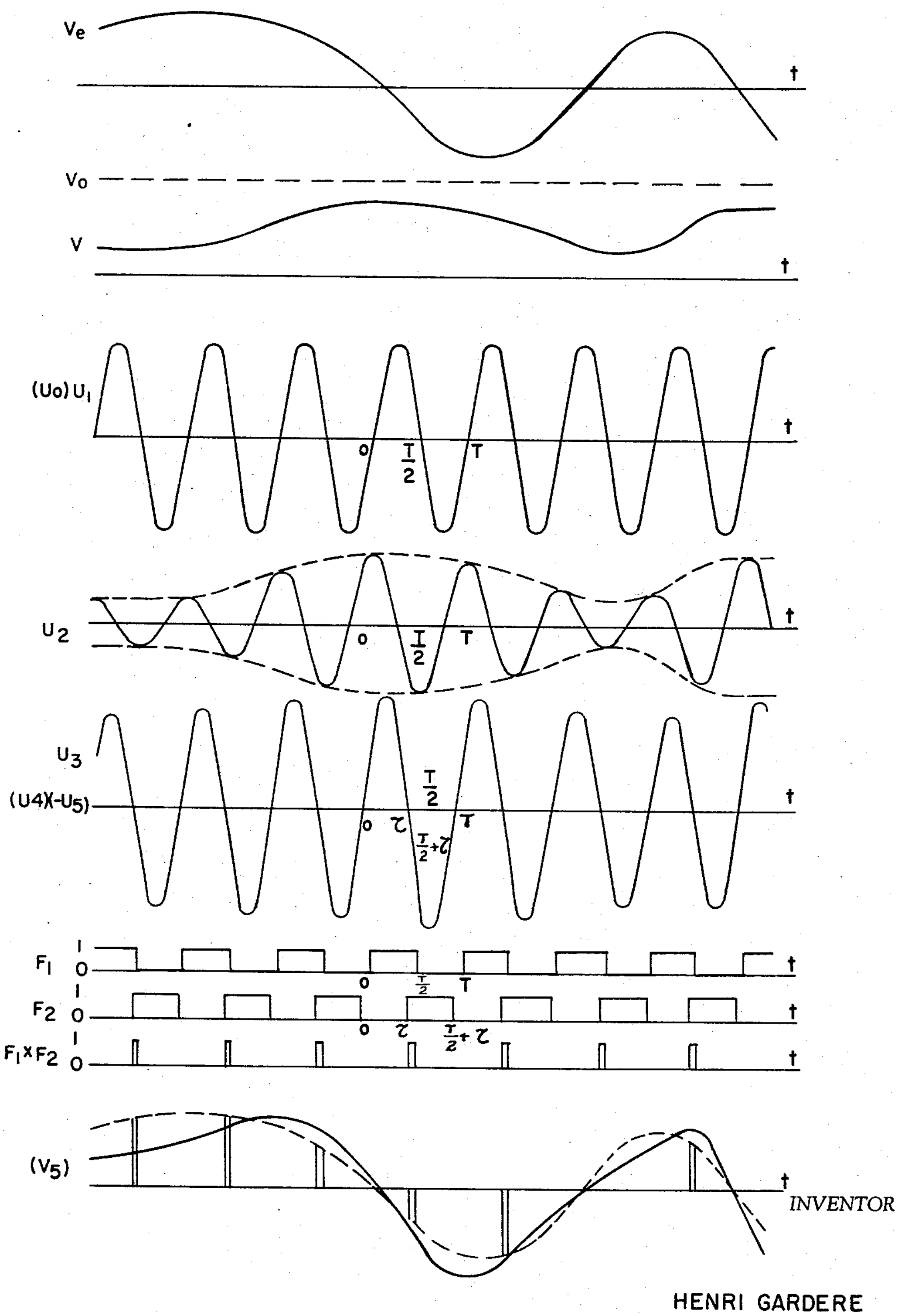

FIGURES 5*a* and 5*b* illustrate different embodiments of the instant invention which perform corresponding functions to the devices shown in FIGURES 1*a* and 1*b*;

FIGURE 5*c* illustrates the waveforms appearing at various points in the system of FIGURE 5*a*; and FIGURE 6 is a diagram showing the phase relationship between voltages at various points of the device according to the present invention, in both cases of FIGURES 5*a* and 5*b*.

The device of the instant invention, as well as that described in the above-mentioned patent, may incorporate either of two different types of phase-shifters: the one, known as "$D_1$-type," which produces a phase-shift angle the tangent of which is directly proportional to the control voltage; and the other, known as "$D_2$-type," which produces a phase-shift, the tangent of which is inversely proportional to the control voltage. Whatever type the phase-shifter may be, $\alpha$ designates herein the phase-shift between the voltage applied to the control terminals of the first modulator and the voltage applied to the control terminals of the second modulator.

FIGURE 1*a* illustrates a known device which may be used to obtain an output voltage $V_s$ which is the product of the input voltage $V_e$ and the control voltage V applied to the phase-shifter.

In this figure, a first ring modulator 2 having input terminals to which is applied the input voltage $V_e$ is directly connected in series to a second ring modulator 3 having output terminals 4 from which is obtained the output voltage $V_s$. An auxiliary oscillator 5 supplies a carrier voltage $V_0$, on the one hand, directly to control terminals 6 of first modulator 2 and, on the other hand, to control terminals $a_1$ and $a_2$ of second modulator 3 by way of a "'D$_2$-type" phase-shifter 8 and an amplifier 11.

The "D$_2$-type" phase-shifter consists of an auxiliary ring modulator 13, the input terminals 9 of which receive voltage V, and the control terminals 14, 15 of which are connected to the phase-shifter input terminals 7. To those terminals 7 is also connected an adjustable attenuation network 16 and a 90° phase-shifting network 17; the output voltage of said latter device, connected in series with the voltage at terminals of the secondary winding of the output transformer of auxiliary modulator 13, is collected at output terminals 10 of the phase-shifter 8, and applied to amplifier 11.

If $V_0$ is the value of voltage V which produces a phase-shift of $\pi/4$, and if $m$ designates a constant less than 1, one gets:

$$V_s=\frac{2m}{\pi}V_e\left(\frac{\pi}{2}-\alpha\right)$$

$$\tan\alpha=\frac{V_o}{V}$$

if $$\frac{V_o}{V}\gg 1,\ \frac{\pi}{2}-\alpha$$

is small, and one obtains approximately $$\frac{\pi}{2}-\alpha=\text{cotan }\alpha$$

it is then found:

$$V_s=\frac{2m}{\pi V_o}V_eV$$

FIGURE 1*b* shows the structure used when one wants to get, at its device output, a voltage $V_s$ which is the quotient of voltage $V_e$ applied to its input, by control voltage V applied to the phase-shifter.

In this structure, the phase-shifter is of the "D$_1$-type," i.e., the device 17 which produces a 90° phase-shift is connected between its input terminals 7 and the control terminals 14, 15 of auxiliary modulator 13.

Using the same notations as in the foregoing formulas, it is then found:

$$V_s=\frac{2m}{\pi}V_e\left(\frac{\pi}{2}-\alpha\right)$$

$$\tan\alpha=\frac{V}{V_0}$$

if $$\frac{V}{V_0}\gg 1,\ \frac{\pi}{2}-\alpha$$

is small, and one obtains approximately:

$$\frac{\pi}{2}-\alpha=\text{cotan }\alpha$$

hence $$V_s=\frac{2mV_0}{\pi}\frac{V_e}{V}$$

Whether the type of phase-shifter utilized in the D$_1$- or D$_2$-type, its output voltage $U_3$ will be the resultant of two voltages: one, which will be referred to as $U_1$, and which is in phase with $U_0$; and the other one, which will be referred to as $U_2$, which is obtained via component 17, and therefore is 90° out of phase with $U_0$.

In phase-shifter D$_2$ (FIGURE 1*a*), voltage $U_1$, in phase with $U_0$, is obtained at the terminals of secondary winding of output transformer 18, while voltage $U_2$, 90° out of phase with $U_0$, is obtained at the output terminals of component 17.

On the other hand, in phase-shifter D$_1$ (FIGURE 1*b*), voltage $U_1$, in phase with $U_0$, is obtained at the output of adjustable attenuation network 16, while voltage $U_2$, 90° out of phase $U_0$, is obtained at the terminals of the secondary winding of transformer 18.

The voltage, at output terminals $a_1a_2$ of amplifier 11, referred to as $U_4$, is in phase with $U_3$ and differs from that voltage only in magnitude. This voltage $U_4$ is applied to the control terminals of second modulator 3. Whatever the type phase-shifter 8 may be, $\alpha$ designates the phase-shift between $U_4$ applied to second modulator 3 and $U_0$ applied to first modulator 2.

This being assumed, one will refer to FIGURE 2, which is a diagram showing the phase relationship between voltages at various points of the device as above described, in both cases of FIGURES 1*a* and 1*b*. That figure shows voltage $U_1$, the phase of which is the same as the phase of $U_0$ and is taken as reference; voltage $U_2$, 90° out of phase with $U_1$; resultant voltage $U_3$; and voltage $U_4$ in phase with $U_3$. Notations ($U_0$) ($U_4$) indicate that the corresponding vectors represent also the phase of these voltages, but not the amplitudes thereof.

From that figure, it can be seen that if the phase shift between $U_0$ and $U_2$, produced by component 17, is not exactly $\pi/2$, a variation of the same magnitude will result in the angle $$\left(\frac{\pi}{2}-\alpha\right)$$

and the smaller the quantity $$\left(\frac{\pi}{2}-\alpha\right)$$

is, i.e., the closer $\alpha$ is to $\pi/2$, the greater will be the relative error on $$\left(\frac{\pi}{2}-\alpha\right)$$

Thus, the closer the operating conditions of component 17 are to optimum, the more influence the stability of that device will have on over-all device operation and accuracy and on the level of output voltage $V_s$. In showing previously that $$V_s=\frac{2m}{\pi V_0}V_eV$$

it was assumed that $$\frac{\pi}{2}-\phi$$

was small. Referring to FIGURE 2, it can be seen that a small variation in required phase shift of $\pi/2$ between $U_0$ and $U_2$, produced by the component 17, will result in a variation of corresponding magnitude in the angle $$\left(\frac{\pi}{2}-\phi\right)$$

*causing instability* of operation of the device. The conditions for optimum operation of the device are therefore contradictory since on the one hand $$\left(\frac{\pi}{2}-\phi\right)$$

should be as small as possible, on the other hand small variations in the phase shift $\pi/2$ cause relatively large variations in the small angle $$\left(\frac{\pi}{2}-\phi\right)$$

Thus, in the arrangement of FIGURES 1*a* and 1*b*, it is apparent that the stability of phase-shifting network 17 is highly critical.

The device according to the present invention, which comprises, as previously mentioned, switching modulators, and a phase inversion between the output of the phase-shifter and the control circuit of the second modulator, does not present such a disadvantage as will be shown below.

It is well known that a switching modulator will pass, practically without attenuation, the current applied to its input, if the voltage applied as "a carrier" to its control circuit has a certain direction, while when the said voltage has the opposite direction, it considerably attenuates the said current. The well-known telegraphic blocking device is a typical example of a switching modulator. This type of modulator has two operating states, ON and OFF. When switched on, the signal applied to its input terminals is allowed to appear to its output with negligible attenuation. When the modulator is off, no output signal appears at the output terminals. The input signal to the modulator is therefore effectively chopped. The frequency and amplitude of the chopped wave will depend upon the frequency of the carrier signal applied to the control circuit of the modulator and the time in the cycle of the input signal that switching occurs.

Generally speaking, a modulator is designed for carrying out a multiplication of the current applied "in modulation" in its input circuit by the current applied "in carrier" in its control circuit. The device according to the present invention produces, in a known manner, two successive multiplications of the current applied to the input of the first modulator, respectively by the "characteristic functions" of the two modulators, this characteristic function representing diagrammatically the physical properties of the modulators, and having the conventional value 1 when the modulator is "conducting" and the value zero when the modulator is "blocking."

In the device according to the present invention, the modulators are of the switching modulator type. The novel results which this change produces in combination with the previously mentioned phase inversion will be discussed below.

FIGURE 3*a* represents, as a function of time, the characteristic function $F_1$ of first modulator, having a period T; and FIGURE 3*b* represents the characteristic function $F_2$ of second modulator, having the same period T, but shifted by a time interval $t$ in relation to function $F_1$.

The table of FIGURE 4 gives the values of functions $F_1$ and $F_2$ at various instants of period T, as well as the corresponding values of product $(F_1F_2)$, i.e., the medium value of the envelope defined by the two successive modulators. This medium value makes possible the calculation of the amplitude of the output voltage of second modulator; the table of FIGURE 4 shows that said amplitude is proportional to:

$$\frac{\frac{T}{2}-t}{T} \text{ i.e. } \frac{(\pi-\alpha)}{2\pi}$$

FIGURES 5*a* and 5*b* are diagrams relating to two embodiments of voltage control systems according to the invention, respectively corresponding to the known devices shown in FIGURES 1*a* and 1*b*.

FIGURE 5*a* illustrates a device which provides an output voltage $V_s$ proportional to the product of its input voltage $V_e$ and a control voltage V applied by way of phase-shifter 8; this device, therefore, performs the same operation as the device shown in FIGURE 1*a*, but differs from this latter device by the following features: Modulators 2 and 3 are of the "chopper type"; a phase reversal network 19 has been inserted between amplifier 11 and second modulator 3 so that a voltage $U_5$ equal to $U_4$ but of opposite phase is now applied in control of this modulator; and phase-shifter 8 is of the "$D_1$-type" rather than the "$D_2$-type."

As above, $\alpha$ designates the phase-shift between $U_0$ and $U_4$; however, due to phase-reversal network 19, the voltage controlling second modulator 3 will equal $U_5$ and, therefore, the phase-shift between $U_0$ and $U_5$ will be $(\pi-\alpha)$. FIGURE 5*c* provides an illustration of the waveforms appearing at various points in the system of FIGURE 5*a* to facilitate an understanding thereof.

Under such conditions, one obtains, with the same notations as previously:

$$V_s=\frac{m}{2\pi}V_e(\pi-\alpha)$$

with $$|\tan(\pi-\alpha)|=|\tan\alpha|=\frac{V}{V_0}$$

if $$\frac{V}{V_0}\ll 1,\ (\pi-\alpha)$$

is small, and one gets approximately $$V_s=\frac{m}{2\pi V_0}V_eV$$

FIGURE 5*b* is the diagram of a device which provides an output voltage $V_s$ proportional to the quotient of its input voltage $V_e$ and a control voltage V applied by way of phase-shifter 8; this device, therefore, performs the same operation as the device shown by FIGURE 1*b*, but differs from that device by the following features: Modulators 2 and 3 are of the chopper type; a phase-reversal network 19 has been inserted between the amplifier 11 and second modulator 3 so that a voltage $-U_4$ is now applied in control of this modulator: and phase-shifter 8 is of the "$D_2$-type" rather than the "$D_1$-type."

Under such conditions, one gets:

$$V_s=\frac{m}{2\pi}V_e(\pi-\alpha)$$

with $$|\tan(\pi-\alpha)|=|\tan\alpha|=\frac{V_0}{V}$$

if $$\frac{V_0}{V}\ll 1,\ \pi-\alpha$$

is small, and $(\pi-\alpha)\approx\tan(\pi-\alpha)$. It is then found:

$$V_s=\frac{mV_0}{2\pi}\frac{V_e}{V}$$

It should be noted that phase-reversal network 19 may be simply a network of crossed connections or may take other forms which are consistent with the teachings of the present invention.

FIGURE 6 is a diagram showing the phase relationship between voltages at various points of the device according to the present invention, in both cases of FIGURES 5*a* and 5*b*. This diagram shows voltage $U_1$, in phase with $U_0$, the phase of which is taken as reference; voltage $U_2$ 90° out of phase with $U_1$; resultant voltage $U_3$ phase-shifted by $(\pi-\alpha)$ in relation to $U_0$ or $U_1$; voltage $U_4$ in phase with $U_3$; and voltage $U_5$ opposite in phase to $U_4$, thus phase-shifted by $\pi-\varphi$ in relation to $U_0$ or $U_1$. Notation $(U_0)$ indicates that the corresponding vector represents only the phase of said voltage, but not its amplitude.

This figure shows that, if the phase-shift caused by component 17 differs somewhat from $\pi/2$, the value of $(\pi-\alpha)$ is comparatively little affected; the better of the above-mentioned optimum conditions $$\left(\frac{V}{V_0}\ll 1\right.$$

for "$D_1$-type" phase-shifter and $$\frac{V}{V_0}\ll 1$$

for "$D_2$-type" phase-shifter) are achieved, the less is the variation of $(\pi-\alpha)$. Therefore, the output level $V_s$, which is proportional to $(\pi-\alpha)$, remains stable in spite of the fluctuations of phase-shift caused by the component 17 which is due to produce a 90° phase-shift.

In the previously known systems, the overall "transfer factor" of the two modulators is proportional to $$\frac{\pi}{2}-\phi$$

(where $\varphi$ is the phase shift between the control voltages of the two modulators), whereas in the system according to the invention, said overall transfer factor is proportional to $\pi-\varphi$.

This is an important technical improvement, because the null transfer factor (which corresponds to a reference position used for the adjustment of the system) is easily obtained only by crossing the connections at the control terminals of the second modulator 3 (FIGURES *5a* and *5b*), whereas in the known system such null transfer factor is obtained only when the control currents of the two modulators are 90° out of phase, which is much more difficult to carry out.

Other modifications and variations of the present invention are possible in the light of the above teachings. It is, therefore, to be understood that within the scope of the appended claims the invention may be practiced otherwise than as specifically described.

I claim:

1. A device for controlling the gain or attenuation of an input voltage comprising first and second switching modulators, each having an input circuit, an output circuit, and a control circuit, the output circuit of said first modulator being connected to the input circuit of said second modulator, a fixed-frequency carrier voltage source feeding carrier voltage to the control circuit of each of said modulators, an adjustable phase-shifting means having an output and producing a phase-shift responsive to the magnitude of an applied input control voltage, an amplifier and a phase-reversal network connected in series to the output of said phase-shifting means, the combination of said phase-shifting means, amplifier, and phase-reversal network being connected between said carrier voltage source and the control circuit of said second modulator.

2. A device as defined in claim 1, in which said adjustable phase-shifting means is so constructed and arranged as to produce a phase-shift whose tangent is proportional to said control voltage, thereby providing is said device an output voltage which is proportional to the product of its input voltage and the control voltage applied to said phase-shifting means.

3. A device as defined in claim 1, in which said adjustable phase-shifting means is so constructed and arranged as to produce a phase-shift whose tangent is inversely proportional to said control voltage, thereby providing in said device an output voltage which is proportional to the quotient of its input voltage and the control voltage applied to said phase-shifting means.

4. A device for controlling the gain or attenuation of an electric wave comprising first and second switching modulators connected in cascade with a circuit carrying said electric wave, each of said modulators having a control circuit, a fixed-frequency carrier voltage source feeding carrier voltage to the control circuit of each of said modulators, a phase-reversal network, a voltage variable phase-shifting means responsive to a control voltage and connected to said phase-reversal network between said carrier voltage source and the control circuit of said second modulator for effecting in said device a phase-shift between the carrier voltage applied to said first and second modulators capable of producing an output voltage in said device which is proportional to the product of the input voltage and said control voltage, said phase-shifting means being arranged to produce a phase-shift whose tangent is proportional to said control voltage.

5. A device for controlling the gain or attenuation of an electric wave comprising first and second switching modulators connected in cascade with a circuit carrying said electric wave, each of said modulators having a control circuit, a fixed-frequency carrier voltage source feeding carrier voltage to said first modulator, a variable phase-shifting means connected between said carrier voltage source and the control circuit of said second modulator through a phase-reversal network, said variable phase-shifting means being responsive to a control voltage for producing between the voltage applied respectively to the control circuits of said first and second modulators, a phase-shift whose tangent is proportional to said control voltage.

6. A device for controlling the gain or attenuation of an electric wave comprising first and second switching modulators connected in cascade with a circuit carrying said electric wave, each of said modulators having a control circuit, a fixed-frequency carrier voltage source feeding carrier voltage to the control circuit of each of said modulators, a phase-reversal network, a voltage variable phase-shifting means responsive to a control voltage and connected to said phase-reversal network between said carrier voltage source and the control circuit of said second modulator for effecting in said device a phase-shift between the carrier voltages applied to said first and second modulators capable of producing an output voltage in said device which is proportional to the quotient of the input voltage and said control voltage, said phase-shifting means being arranged to produce a phase-shifting whose tangent is inversely proportional to said control voltage.

7. A device for controlling the gain or attenuation of an electric wave comprising first and second switching modulators connected in cascade with a circuit carrying said electric wave, each of said modulators having a control circuit, a fixed-frequency carrier voltage source feeding carrier voltage to said first modulator, a variable phase-shifting means connected between said carrier voltage source and the control circuit of said second modulator through a phase-reversal network, said variable phase-shifting means being responsive to a control voltage for producing between the voltages applied respectively to the control circuits of said first and second modulators, a phase-shift whose tangent is inversely proportional to said control voltage.

8. In a device for adjusting the gain or attenuation of an electrical signal, two modulators provided with input terminals, control terminals, and output terminals, the signal to be adjusted being applied to the input terminals of the first modulator, the output terminals of the first modulator being connected to the input terminals of the second modulator, and the adjusted signal being collected at the output terminals of the second modulator, a source of alternating potential of fixed frequency, means for connecting said source on one hand directly to the control terminals of one of the modulators and, on the other, to the control terminals of the other modulator by means of a voltage-controlled phase-shifting means directly connected in series between said source and an amplifier, the improvement essentially consisting of a means for effecting a voltage phase reversal of 180° inserted between said amplifier and the control circuit of said other modulator and said two modulators being switching modulators.

9. A device for adjusting the amplitude change of an electric signal by means of a control voltage, characterized in that it comprises, in cascade with a circuit carrying the signal, two switching modulators connected together, said modulators each having control circuits and a common fixed-frequency carrier voltage source feeding said control circuits, a phase-shifting means connected between said source and one of the modulators having terminals for applying said control voltage thereto, said one modulator being responsive to said phase-shifting means so as to produce between said carrier voltage of the two modulators a phase-shift which depends upon the value of said control voltage applied to the said phase-shifting means, and network means for effecting voltage phase reversal connected between said phase-shifting means and said one modulator.

10. In a device for adjusting the gain or attenuation of an electric signal, two switching modulators each provided with input terminals, control terminals, and output terminals, the signal to be adjusted being applied to the input terminals of the first modulator, the output terminals of the first modulator being connected to the input terminals of the second modulator, and the adjusting signal being collected at the output terminal of the second modulator, a source of alternating potential of fixed frequency, means for connecting said source on the one hand to the control terminals of one of the modulators and, on the other hand, to the control terminals of the other modulator by means of a voltage-controlled phase-shifting means, and network means for effecting voltage phase connected between said phase-shifting means and said control terminals of the other of said modulators.

No references cited.

ARTHUR GAUSS, *Primary Examiner.*

J. ZAZWORSKY, *Assistant Examiner.*

UNITED STATES PATENT OFFICE
CERTIFICATE OF CORRECTION

Patent No. 3,363,188 January 9, 1968

Henri Gardere

It is certified that error appears in the above identified patent and that said Letters Patent are hereby corrected as shown below:

In the heading to the printed specification, lines 4 and 5, "178 Rue Jeanne d'Arc, Paris XIII, France" should read -- Paris, France, assignor to CIT-Compagnie Industrielle Des Telecommunications, Paris, France, a corporation of France --.

Signed and sealed this 27th day of January 1970.

(SEAL)
Attest:

Edward M. Fletcher, Jr.
Attesting Officer

WILLIAM E. SCHUYLER, JR.
Commissioner of Patents